D. M. BAKER.
TRAP NEST.
APPLICATION FILED MAY 5, 1919.

1,411,397.

Patented Apr. 4, 1922.

Inventor
D. M. Baker

By C. C. Shepherd
Attorney

UNITED STATES PATENT OFFICE.

DONALD M. BAKER, OF COLUMBUS, OHIO.

TRAP NEST.

1,411,397.	Specification of Letters Patent.	Patented Apr. 4, 1922.

Application filed May 5, 1919. Serial No. 294,882.

*To all whom it may concern:*

Be it known that I, DONALD M. BAKER, a citizen of the United States, residing at Columbus, in the county of Franklin and State of Ohio, have invented certain new and useful Improvements in Trap Nests, of which the following is a specification.

This invention relates to trap nests, and its primary object is to provide a simple and efficient device for entrapping a hen within the nest so that a poultry raiser may obtain accurate information as to the laying qualities of every hen, in order that the nonproducers may be weeded out and the paying hens kept. To this end, the invention comprises, among other features, a trap nest wherein an entrance is provided which is adapted to be closed by a swinging door, said door being normally maintained in an elevated position by means of a pivoted trip structure, said latter structure being located interiorly of the nest so that as a hen enters the trip structure will be engaged thereby and the door released so as to gravitate into a position closing the trap entrance, thus effectually preventing the escape of the hen until properly released.

Another object of the invention resides in forming the nest in a plurality of separable sections, in order that upon separating the sections the interior of said nest will be rendered conveniently accessible so that vermin may be readily eliminated and the nest maintained in a sanitary condition.

In the accompanying drawing, wherein a structure has been shown capable of carrying out the principles of the invention:

Similar characters of reference denote like and corresponding parts throughout the several views of the drawing.

Figure 1:
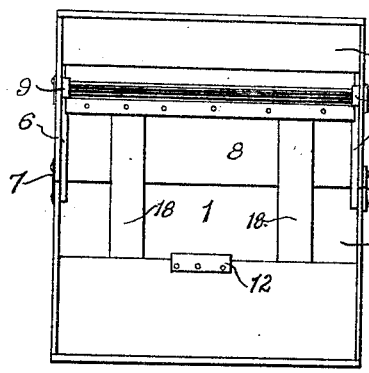
Figure 1 is a front elevation of the trap nest.
Figure 2:
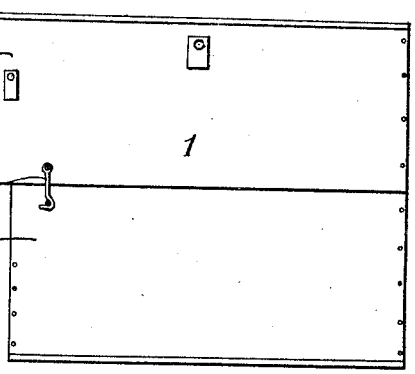
Figure 2 is a side elevation thereof.
Figure 4:
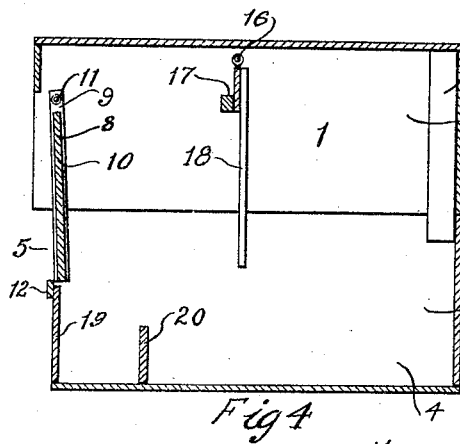
Figure 4 is a similar view disclosing the door member in its lower or entrance closing position.

Referring more particularly to the structure of the invention as the same is set forth in the drawing, the numeral 1 designates in its entirety the trap nest comprising the invention. This nest is formed to include a pair of upper and lower separable sections 2 and 3 respectively, and when assembled said sections provide a setting chamber 4 and an entrance opening 5. Rigid cleat members 6 are carried by the rearward corners of the upper section 2, and have their lower ends protruded so as to lie within the confines of the lower section and meet adjacent to the corners of the latter. Said cleat members serve to effect an aligned positioning of the upper section upon said lower section and also act in the capacity of hinges, by permitting said upper section to be revolved circumferentially with respect to the lower section, the lower ends of said members serving as fulcrums to effect the pivotal swinging movement of said upper section. This construction is favored because of its simplicity and by the fact that it eliminates the use of metallic hinges, thus lowering the cost of fabricating the nest. Hinges, however, may be provided if desired. It will be noted that the outer faces of the nest are perfectly plain and smooth, from which all objectionable extensions or protuberances are eliminated. This construction is effective in positioning a plurality of the nests in contiguous and immediately adjacent relation, practically side by side or in tiers, in order that nests assembled in this manner will occupy but a minimum of space. Pivoted latches 7 may be carried by the nest in order to maintain the sections 2 and 3 in secured relation.

Positioned to cover the opening 5 is a door member 8, which is employed and mounted to permit a hen to readily enter the nest, but after entering to close whereby the escape of the hen from the nest will be prevented, this being done in order to obtain a record of the laying qualities of a hen. The door member 8 in this instance is formed to include a pair of spaced side rails 9 to which are secured an intervening plate member 10 either of a solid or reticulated form, and the upper ends of the rails 9 are horizontally apertured to receive a removable rod 11. This rod extends transversely of the nest and has its ends journaled within the side walls of the section 2 at points preferably contiguous to the upper portion of the entrance 5. It will be apparent from this that left to itself the door member will gravitate to a closed position, its swinging movement in a downward direction being limited by means of a stop plate 12, which latter serves to prevent said door member from being swung outwardly of the nest. In other words, the door member is permitted to swing only on an arc located within the interior of the nest.

To maintain said door member in an elevated position in order that a hen may readily gain access to the chamber 4 of the nest, use is made of a pivoted trip or latch structure 13. This structure in its preferred adaptation consists of an L shaped portion 14 which is mounted transversely of the nest and is supported for swinging movement by means of spaced eyes 15 which, in turn, are mounted for freely swinging movement on a removable transversely extending rod 16, the ends of the latter being journaled within the side walls of the section 2. The lower portion of the structure 13 is provided with a shelf 17 which extends angularly from the body of the portion 14. Spaced cleats 18 extend downwardly from the structure 13 and depend within the chamber 4, so that the entrance of a hen into the latter will, by striking the cleats 18, oscillate the structure 13 as a whole.

Figure 3:
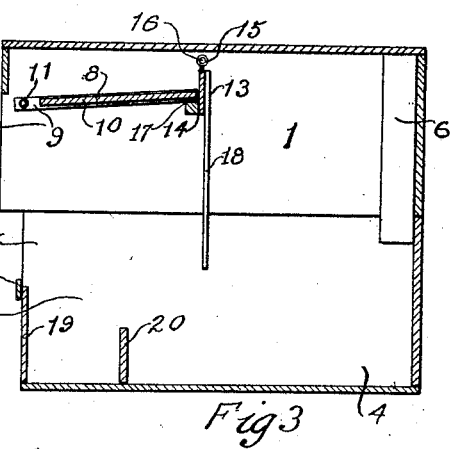
Figure 3 is a vertical longitudinal sectional view taken through the nest and illustrating the door member in its open position.
Figure 5:
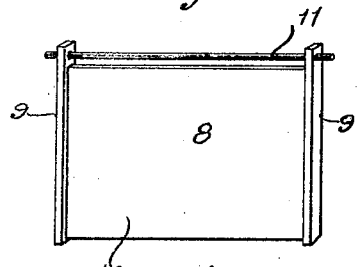
Figure 5 is a detail perspective view of the door member.
Figure 6:
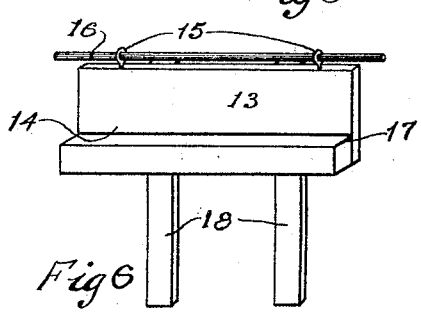
Figure 6 is a similar view of the latch or trip structure.

In operation, in order to set the nest to receive a hen, the member 8 is swung to assume the open position disclosed in Figure 3, so that the lower edge of said door member will rest upon the shelf 17 in order that said door member will be maintained in an elevated position whereby entrance into the nest will be unobstructed. When the parts are thus set, a hen upon reaching the chamber 4 will be obliged to contact with one or the other or both of the depending cleats 18, which will result in the oscillation of the trip structure so as to effect the release of the door member. Thus, when the shelf 17 is freed from engagement with the end of said door member, the latter will be caused to gravitate by its own weight to a closed position so that the entrance 5 will be effectively covered to prevent the escape of the entrapped hen. The stop plate 12, it will be apparent, not only limits the swinging movement of the door member, but also prevents the door from being opened by an outwardly directed pressure. Of course, by extending the length of the door member so that the latter would contact with the upper edge of the panel 19 of the lower section 3, the use of said plate 12 could be eliminated. Again, a baffle member 20 is located within the lower section 3 at a point not far but spaced from the panel 19. This baffle member prevents a hen from setting at a point near the entrance 5 which, if done, would prevent the trip structure from being actuated. However, through the use of said baffle member the hen will be obliged before setting to enter the nest a sufficient distance to actuate the trip structure, thus rendering the operation of the nest thoroughly reliable.

The nest is so constructed as to be capable of being assembled with other nests of like construction in multiple tier formation, so that a maximum number of nests may be placed within the usual limited confines of hen houses. Again, by forming the nest of a plurality of sections its interior is readily accessible at all times so that the same may be kept in a cleanly and sanitary condition and will offer but little difficulty to the cleansing of every part thereof. The rods upon which the door member and trip structure are mounted may also be readily removed from the walls of the upper section 2 so that the door member and trip structure may be taken out of said upper section to further facilitate the cleansing of the nest and the maintaining of the same in a sanitary condition. Again, the mechanism for controlling the operation of the door member 8 is of a very simple and efficient nature, and its operation is rendered reliable and positive through the co-operation of the baffle member 20.

What I claim is:

1. A trap nest comprising a pair of separable upper and lower sections having registering openings formed in certain of the walls thereof, said openings serving to define an entrance to said nest when said sections are in assembled relation, a pivoted door structure for said entrance, and a pair of cleat members rigidly carried by the upper of said sections, said members projecting downwardly within said lower section to retain the sections in assembled relation, and said downwardly extending projections further serving in the capacity of fulcrums to permit of the swinging of said upper section relative to the lower section.

2. A trap nest comprising a pair of separable upper and lower sections having registering openings formed in the front ends thereof to provide an entrance to the nest, an offset member rigidly carried by the upper section and disposed interiorly of the latter contiguous to the rear lower edge thereof, said member being downwardly extended so as to lie between the side walls of said lower section, whereby the alignment of said sections will be maintained by preventing lateral displacement thereof, said member being located entirely within said nest so that the same may be employed in the capacity of a fulcrum to permit of the oscillation of the upper section relative to the lower section, and interiorly actuated trap door mechanism co-operative with said entrance.

In testimony whereof I affix my signature.

DONALD M. BAKER.